United States Patent [19]
MacGregor et al.

[11] 3,937,440
[45] Feb. 10, 1976

[54] METERING PUMP AND COMBINATION TWO-SECTION PINCH-OFF ASPIRATOR VALVE

[75] Inventors: Benjamin N. MacGregor, Flushing; Arnold I. Wilson, Flint, both of Mich.

[73] Assignee: General Motors Corporation, Detroit, Mich.

[22] Filed: Nov. 19, 1973

[21] Appl. No.: 417,227

[52] U.S. Cl. ........... 251/61.1; 137/565; 137/624.11; 141/117; 222/571; 251/5; 251/120
[51] Int. Cl.² ........................................ F16K 31/126
[58] Field of Search ............ 141/117, 119; 222/385, 222/571; 251/5, 61.1, 120; 137/565, 624.11

[56] References Cited
UNITED STATES PATENTS

| | | | |
|---|---|---|---|
| 921,594 | 5/1909 | Crane | 222/385 |
| 1,731,571 | 10/1929 | Heare | 251/5 |
| 2,485,526 | 10/1949 | Bennett | 222/385 |
| 2,786,642 | 3/1957 | Comb | 251/5 |
| 2,988,103 | 6/1961 | Canvasser | 251/5 |
| 3,118,646 | 1/1964 | Markey | 251/5 |
| 3,353,560 | 11/1967 | McCulloch | 251/5 |
| 3,445,085 | 5/1969 | Eckel et al. | 251/5 |

*Primary Examiner*—Irwin C. Cohen
*Assistant Examiner*—George L. Walton
*Attorney, Agent, or Firm*—Peter A. Taucher

[57] ABSTRACT

This invention relates to a positive displacement adjustable volume pumping and dispensing system used to supply measured amounts of viscous material. The system includes a pneumatically or hydraulically driven submersible adjustable volume piston-type pump, and a combination two-section pinch-off aspirator valve that is connected to the pump. The pinch-off section of the valve is used to dispense the metered amount of fluid to the aspirator section of the valve and the aspirator section of the valve prevents drip from the nozzle after the material is dispensed as well as aids in advancing the material to a dispensing nozzle.

3 Claims, 3 Drawing Figures

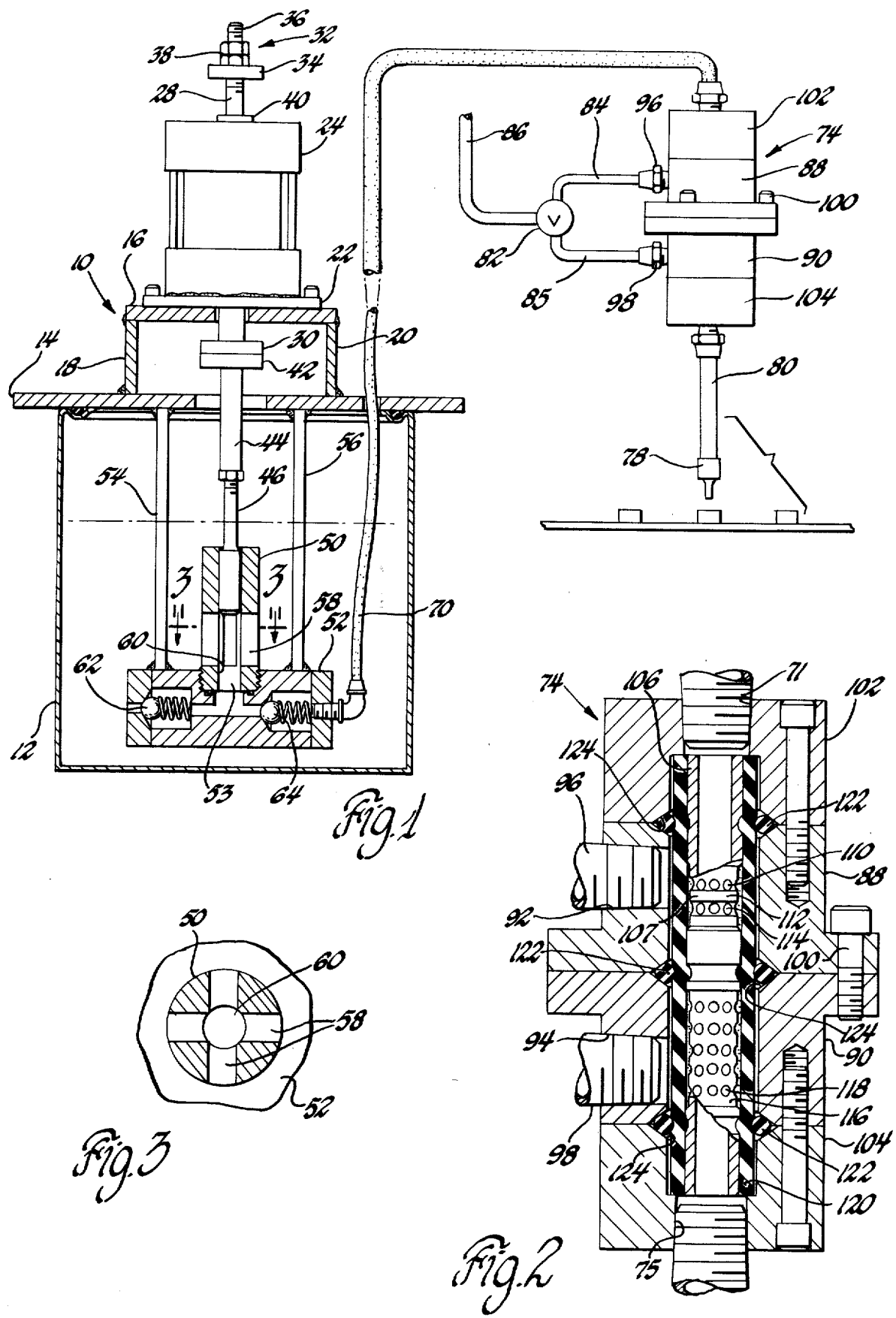

METERING PUMP AND COMBINATION TWO-SECTION PINCH-OFF ASPIRATOR VALVE

The present invention is an inexpensively manufactured dispensing system that includes a convenient and easy means to dispense a measured amount of viscous material such as epoxy resin or other similar materials to a manufactured part without dripping the material on either the conveyor used to carry the part from one work station to another, or on the next part to be processed. In the present invention, the system is used to fill the inside of an electrical thermal switch to hold the contacts in the switch body and also to provide insulation for the contacts. It is understood that the invention could be used whenever a metered amount of viscous material is to be dispensed.

As shown and described, the present invention includes a pump to dispense a metered amount of epoxy resin to a valve having a nozzle at one end and means within the valve to control the metered amount of material dispensed from the pump and which valve further includes an aspirator or suction mechanism that functions to create a suction in the nozzle to prevent drip from the nozzle onto the conveyor or the next part upon the metered amount being dispensed to the part to be filled. The aspirator function conserves material and maintains a clean work area.

Prior art metering pumps are, as an example, used to meter fluid to automobile windshields or the like, as is typically shown in Horton U.S. Pat. No. 2,153,519. Such a pump does not include a valve means to dispense the proper amount of material required to fill a cavity on a part and prevent drip of the dispensed material. A similar prior art valve patent is typically shown in Comb U.S. Pat. No. 2,786,642. The valve shown in Comb is primarily used in refrigerants and does not show a means for dispensing a measured amount of material or preventing drip from the valve.

It is therefore an object of this invention to provide a system that dispenses a metered amount of viscous material through a nozzle without any drip from the nozzle after the material has been dispensed.

It is a further object of this invention to provide a metering pump that includes adjustment means thereon and means to assure the pump chamber is filled after a pump stroke.

It is a further object to provide a pump that is simple in construction and which is readily adapted for placement on a container of the material to be dispensed to retain the pump on the container without the requirement for additional holding means.

It is a further object to provide a pump that can be easily adapted for use with a valve that is a combination two-section pinch-off and aspirator valve, one section being the pinch-off section and the other section being the aspirator section and which further has a dispensing nozzle thereon.

It is a further object to provide a combination pinch-off and aspirator valve that aids the pump in dispensing the material through the interior of the valve to the nozzle.

It is still a further object to provide a combination pinch-off and aspirator valve that is operated by fluid means whereby the aspirator section of the valve operates in sequence with the pinch-off section of the valve to prevent drip from the nozzle after the material has been dispensed to the part to be filled.

Further objects and advantages of the present invention will be apparent from the following description, reference being had to the accompanying drawings wherein a preferred embodiment of the present invention is clearly shown.

FIG. 1 is a view of the system, showing the pump in partial section with the combination pinch-off aspirator valve attached thereto shown in side elevation, a schematic of the conveyor with a part to be filled being also shown.

FIG. 2 is a cutaway section view of the combination two-section pinch-off aspirator valve to more clearly show the internal parts and the operation thereof.

FIG. 3 is a section through line 3—3 of FIG. 1, showing the cylinder and inlet port in more detail.

Referring specifically to FIG. 1, 10 refers to the pump assembly that is placed on top of a container 12 which contains a viscous material such as an epoxy resin and is seated or held in a fixed position thereon by means of flange 14. The flange is constructed large enough and heavy enough to hold the pump in a stationary position on the container. A support member 16 is attached to and supported on flange 14 by means of a plurality of legs 18 and 20, a horizontal plate member 22 being attached to the support member. This arrangement and construction provides a support member for the air cylinder 24.

Air cylinder 24, a commercially available power source, is secured to the horizontal plate member 22 by welding. The air cylinder 24 includes a piston rod 28 that extends through the cylinder and has a flexible coupling 30 at one end, the end closest to flange member 14. A stroke adjustment mechanism 32 is located at the opposite end and includes an adjustable plate 34. Plate 34 is threadedly connected to a threaded portion 36 on the piston and can thereby be moved up and down on piston 28 to provide for stroke adjustment. Nuts 38 lock and hold the plate 34 in the proper position. The length of the stroke is set by adjusting plate 34 up or down on the piston rod 28, with the distance between plate 34 and plate 40 on top of the air cylinder, being the actual stroke length. Plate 34 bottoms on plate 40 at the end of the stroke.

Attached to flexible coupling 30 by any convenient means such as bolts and the like is a second flexible coupling 42 having a shaft 44 integral therewith. Coupling 42 provides for a flexible union between the piston rod 28 on the air cylinder and the shaft 44 that extends into the container 12. A metering piston 46 is threadedly attached to shaft 44 and by use of the threaded connection, an additional or a finer metering adjustment is achieved by extending or retracting the metering piston.

A pump cylinder 50 is attached to a valve housing 52, with the assembly being attached to the flange 14 by any suitable means such as depending support means 54,56 that can be welded to flange 14 and the valve housing. The leg means could be constructed of bolts that fit into the valve housing and pass through holes in the flange 14 and which are held in a permanent position by nut means (not shown). Valve housing 52 containing an inlet check valve 62 and an outlet check valve 64 the operation of which will be more fully explained hereinafter.

Pump cylinder 50 as best shown in FIG. 3 has a plurality of openings 58 cut or drilled into the cylinder to permit the material in which the pump is placed to pass through the openings into a center section 60 to assure that the center section 60 is completely filled at all times prior to the pump stroke of the piston. This construction assures that there are no voids or air pockets in the pump cylinder prior to the pump stroke, due to inadequate or inadvertent operation of the inlet check valve 62.

A hose 70 conveys the material to be dispensed from the pump, on each pump stroke, to the top of the combination two-section pinch-off aspirator valve 74. Valve 74 has a dispensing nozzle 78 attached thereby by means of a tube 80. A four-way fluid operated control valve 82 is attached to valve 74 by any convenient flexible hose or coupling means 84. As shown, the four-way valve 82 is a conventional four-way air valve that controls the air into and out of valve 74, the operation of which will be more fully explained in connection with the operation of aspirator valve 74. An air supply is provided to the four-way valve, through hose 86.

Referring specifically to FIG. 2, valve 74 is made up of a pair of sleeves 88,90 having ports 92,94, respectively therein. A screw type fitting 96,98 is provided in each port to which the air supply hoses 84 and 85 are connected. Sleeve members 88,90 are held together in axial alignment by bolt means 100. Mounted above and below the sleeve members are a pair of end cap members 102,104. The sleeve members 88 and 90 together with the end cap members 102,104 form the valve housing having a centerbore therethrough from end to end. Cap members 102 and 104 can be bolted or welded to the sleeves 88,90.

A metal support tube 106 is positioned within the centerbore and extends from the inlet opening 71 to the outlet opening 75 in the valve housing. The outside diameter of tube 106 adjacent the area of port 96 is smaller than the outside diameter of the section of the tube above and below it. This smaller or narrower diameter tube section 107 has a plugged section 112 intermediate its ends with a first plurality of openings 110 located above section 112 and a second plurality of openings 114 below section 112. This section of the valve in the general area of port 92 is referred to as the pinch-off section.

A plurality of openings 118 are also provided in the lower portion of the metal support tube 106 adjacent the area of port 94, this lower portion 116 being smaller in outside diameter than the outside diameter those sections of tube 106 above and below it. This section of the valve is referred to as the aspirator section A soft, resilient tubing 120 is held in place around the support tube 106 by a plurality of O-rings 122 that fit into the generally notched-out portions 124 in sleeves 88,90 and caps 102,104 to provide for a seal between and at the ends of the pinch-off and aspirator sections and a means of retaining the tubing on the metal support tube. The small diameter sections 107 and 116 of support tube 106 in which the openings 110,114, and 118 are located create an annular space between the support tube and the surrounding resilient tubing.

In operation, the air cylinder power source drives piston rod 28 downwardly which in turn drives shaft 44 and metering piston 46. Piston 46 moves downwardly into the filled pump cylinder 50 to push or displace the metered amount of material in section 60 through outlet check valve 64 and hose 70 into the valve 74, the metered amount of material being a function of the length of the stroke of the piston and the area 53 in the valve housing. It is to be understood that to initially dispense the proper amount of material, it is necessary for the pump to operate several times in order to fill the system, prior to any material being dispensed after which the metered or measured material to be dispensed moves through hose 70 down through the metal support tube 106. During the pump stroke, no air is applied to port 92 which is instead vented to atmosphere to thereby relax the tubing adjacent port 92 to allow the material to move through the pinch-off section of the valve, through openings 110 around the closed center section 112 and into openings 114, to move down the center tube past openings 118. During the pump stroke, air however is applied to the aspirator section of the valve through port 94 to force the soft resilient tubing into contact with the lower small diameter section 116 on the support tube 106 and to put this section in position for aspiration to prevent drip of the viscous material out of the 106 and nozzle 78.

On the return or fill stroke, and as the piston moves upwardly toward the top of the stroke, the cylinder 50 and the valve chamber 53 is filled through the inlet check valve 62 and the inlet ports 58 as previously described. The outlet ball check valve is closed during the return or fill stroke of the piston. As the piston begins the fill or return stroke, air is applied to port 92 to move the resilient tubing into contact with the small diameter section 107 on the support tube 106 to close or pinch-off communication between the openings 110 and 114 and thus isolate the aspirator section. At the same time, the air previously applied to port 94 is vented to atmosphere through the four-way check valve to allow the resilient tubing to naturally expand away from the small diameter section 116 and openings 118 thereby effecting an expanding annular chamber between the tubing and section 116 as shown in FIG. 2 to thus create a suction on the openings 118 in the lower or aspirator section of the valve which prevents any material from dripping from the nozzle 78 by suctioning material out through openings 118 and thereby away from the nozzle. The pump stroke and fill stroke operation is continued in timed sequence with the movement of a conveyor to place the parts to be filled beneath the nozzle.

The invention as shown and described is a simple, easily constructed system that provides a submerged pump and a pinch-type valve means for dispensing a measured amount of generally viscous material to a production part or assembly that is moved in timed sequence by a conveyor and which system includes aspirator means in the valve to prevent dripping of the material from the dispensing nozzle to assure accurate volumetric delivery and clean materials handling equipment, parts, and work station after being dispensed and the conveyor is operating to move another part to be filled under the nozzle. The embodiment shown in this invention is used to dispense a viscous material on switches in a similar manner to that of potting but is a much more effective and cleaner means than potting.

While the embodiments of the invention as herein disclosed constitute a preferred form, it is to be understood that other forms could be adopted.

We claim:

1. A combination two-section pinch-off aspirator valve for dispensing a measured amount of material, said valve comprising: a housing having inlet and outlet openings; a support tube within said housing extending between said inlet and outlet openings; said support tube having a closed section a distance below the inlet opening to divide the support tube into an upper and lower section; said support tube also having a first plurality of openings in spaced relation around said support tube above and below said closed section to connect the upper and lower sections of the support tube; said support tube further including a second plurality of openings in the lower section thereof in spaced relation around said support tube a distance below said closed section; said support tube being smaller in diameter in the area of the first and second plurality of openings in said support tube; a resilient tube means positioned about said support tube and cooperating with said support tube defining a passage around the periphery of said support tube closed section and defining a chamber around the periphery of said support tube at said second plurality of openings; said housing having a first air inlet port that surrounds the resilient tube means adjacent the passage at said first plurality of openings in said support tube, and a second air inlet port that surrounds the resilient tube means adjacent the chamber at said second plurality of openings in said support tube, whereby the resilient tube means flexes out of said smaller diameter area in said support tube by air being exhausted from said first inlet port opening the passage around said closed section in the first plurality of openings in said support tube to dispense a measured amount of material to the lower section of the support tube while air is applied to the second air inlet port to force said resilient tube to close the chamber at said second plurality of openings in said support tube, air then being applied to said first inlet port to close the passage around said first plurality of openings in said support tube to stop the flow of material to the lower section of said support tube, and the at the same time air being vented from said second inlet port, whereby the resilient tube moves away from the second plurality of openings in said support tube opening said chamber creating a suction in the lower section of said support tube suctioning material out through said second plurality of openings into said chamber thereby preventing drip from said valve.

2. A non-drip valve assembly for dispensing an accurately measured amount of fluid from an adjustable pump, said valve assembly comprising: a housing having an inlet and an outlet fluidly connected by a valving passage; tube means within said passage, said tube means having an intermediate closed section to divide the tube means into a first section between the closed section and the inlet and a second section between the closed section and the outlet; a first plurality of openings in said tube means upstream and downstream of said closed section; a second plurality of openings in the second section of the tube means downstream of said closed section and said first plurality of openings; resilient tube means surrounding said tube means in said valving passage; seal means between the housing and said resilient tube means upstream of the first openings, intermediate said first and second openings and downstream of said second openings, said resilient tube means being peripherally spaced from the surfaces of the valving passage in the area of the first and second plurality of openings and being normally spaced from said openings cooperating with said tube means defining a fluid directing passage around the periphery of said tube means closed section and defining a fluid receiving chamber around the periphery of said tube means at said second plurality of openings; a first inlet port in the housing communicating with the valving passage adjacent the fluid directing passage at said first plurality of openings; a second inlet port in the housing communicating with the valving passage adjacent the fluid receiving chamber at said second plurality of openings; valve means for alternately applying fluid pressure at said first and second ports to allow the resilient tube means to engage said closed section closing said fluid directing passage upon application of pressure and unseal the openings upon removal thereof whereby a measured amount of fluid will be dispensed between said first and second sections when the first air inlet port is not pressurized and said second port is pressurized to seal said resilient tube means against the second plurality of openings closing said fluid chamber, pressure being alternately applied to said ports to close said fluid directing passage and seal the first plurality of openings in said tube means to stop the flow of material to said second section, and at the same time venting from said second inlet port through said valve means whereby the resilient tube means moves away from the second plurality of openings opening said fluid receiving chamber to create a suction in said second section suctioning fluid through said second plurality of openings into said fluid receiving chamber thereby preventing drip from said valve assembly.

3. A two section pinch-off aspirator valve for dispensing an accurately measured amount of viscous material from a container as delivered by an adjustable stroke pump comprising: a housing; inlet and outlet openings in said housing; said inlet means being fluidly connected to said container, a support tube within said housing extending between the inlet and outlet openings; said support tube having a closed section a distance below the inlet opening to divide the support tube into a lower and upper section; said support tube having a first plurality of openings above and below said closed section to connect the upper section to the lower section, said support tube having a second plurality of openings in the lower section; resilient tube means surrounding said support tube; said support tube being smaller in diameter adjacent said first and second plurality of openings in said support tube; said support tube and said resilient tube means cooperating defining a passage around the periphery of said support tube closed section and defining a chamber around the periphery of said support tube at said second plurality of openings; said housing having a first air inlet port adjacent said first plurality of openings in said support tube which surrounds said resilient tube means adjacent the passage around said support tube closed section and said openings, and a second air inlet port that surrounds said resilient tube means adjacent the chamber around the periphery of said support tube and said second plurality of openings; a nozzle secured to said support tube to dispense the viscous material; valve means to exhaust air from said first inlet port to allow the resilient tube means to move away from the smaller diameter areas in said support tube to open said passage and the first plurality of openings in said support tube and dispense a measured amount of material to the lower section of the support tube while air is applied by said valve means to the second air inlet port to force said resilient tube to close the chamber and the second plurality of openings in said support tube, and air being applied by said valve means to said first inlet port to close the passage and the first plurality of openings in said support tube to stop the flow of material to the lower section of said support tube, and at the same time air being vented from said second inlet port through said valve means whereby the resilient tube moves away from the second plurality of openings in said support tube opening said chamber to create a suction in the lower section of said support tube suctioning material through the second plurality of openings into said chamber to thereby prevent drip from said nozzle.

* * * * *